Oct. 6, 1936.  G. E. EDMUNDS  2,056,653
CAR BRAKE MECHANISM
Filed March 22, 1934      5 Sheets-Sheet 2
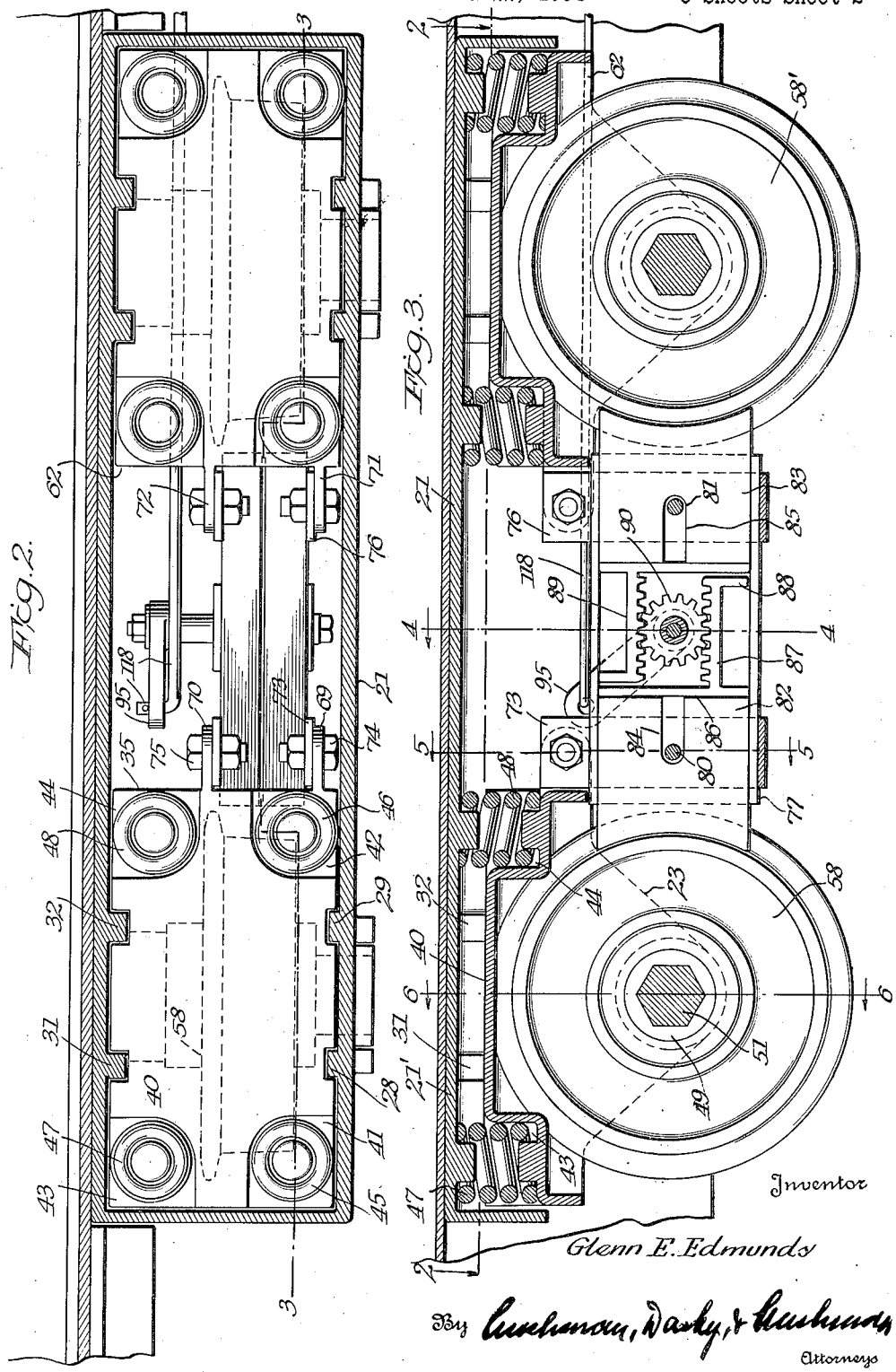
Inventor
Glenn E. Edmunds
By Cushman, Darby, & Cushman
Attorneys

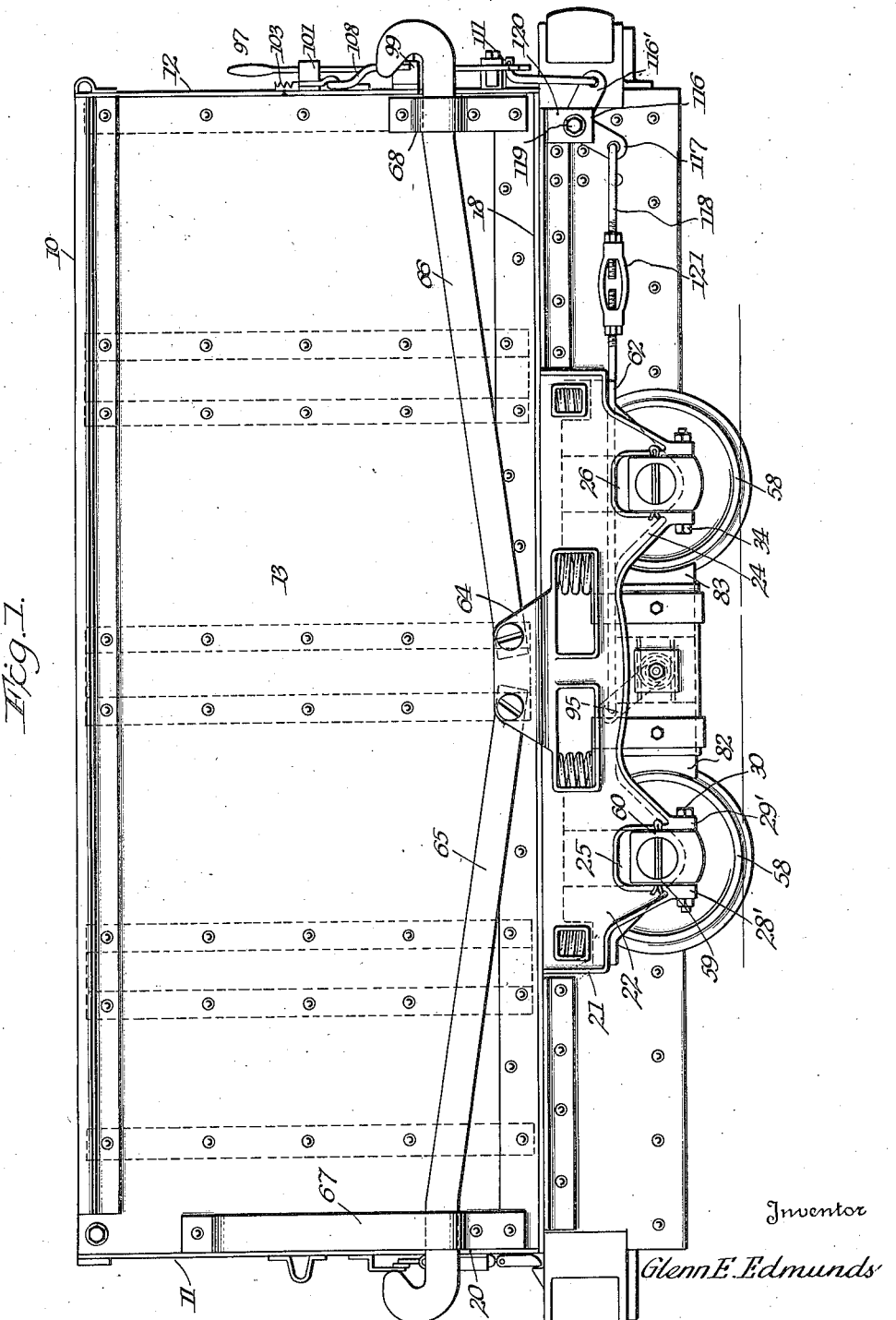

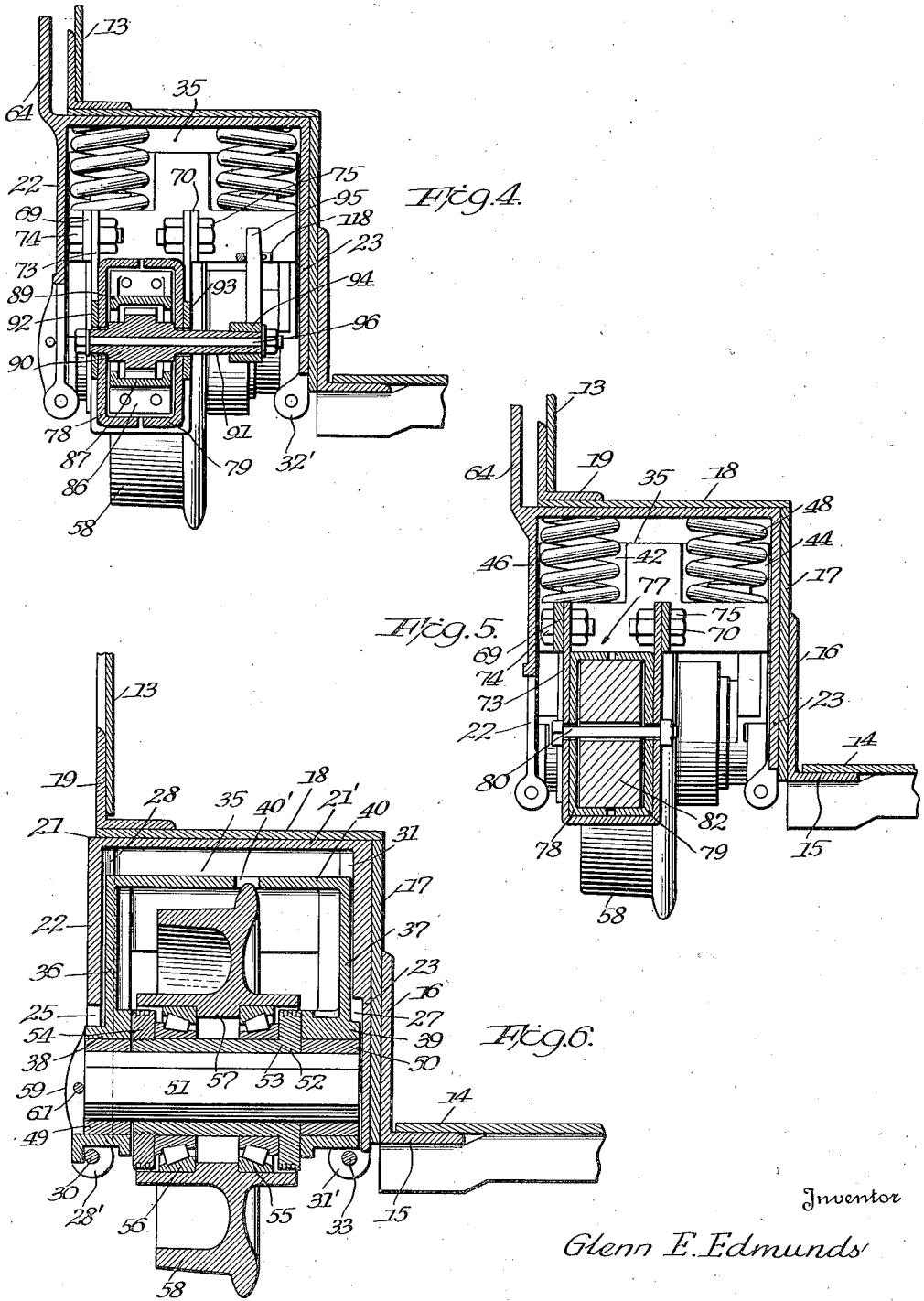

Oct. 6, 1936.  G. E. EDMUNDS  2,056,653
CAR BRAKE MECHANISM
Filed March 22, 1934   5 Sheets-Sheet 4
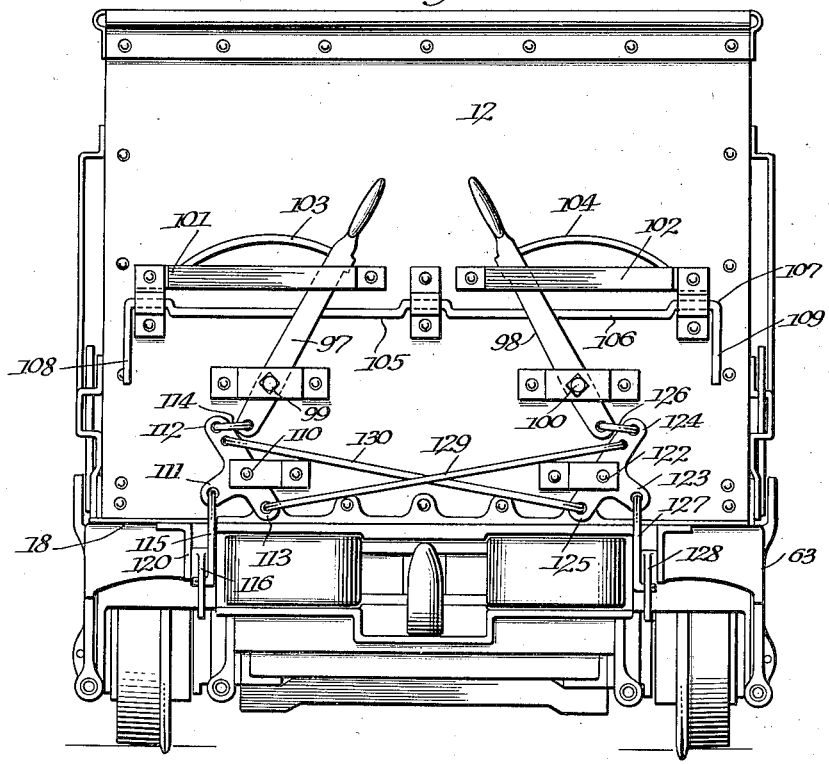
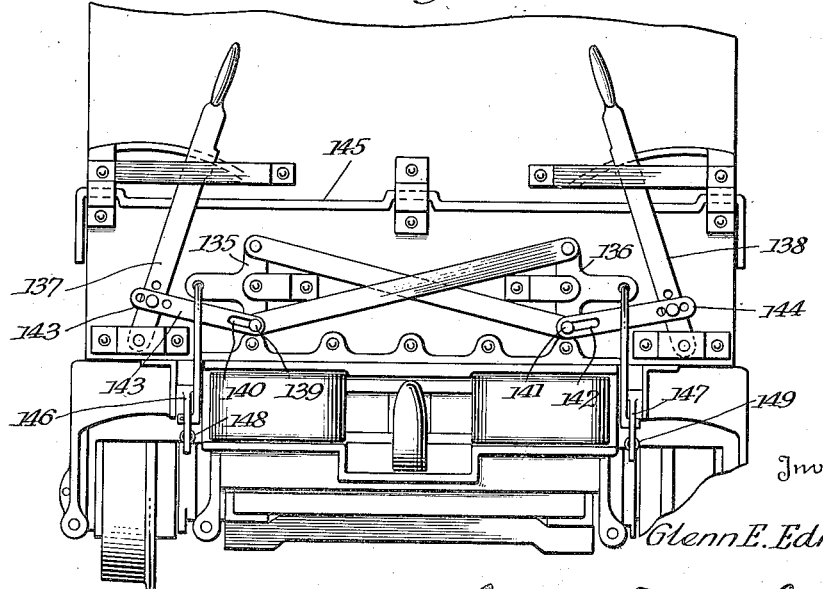

Oct. 6, 1936.    G. E. EDMUNDS    2,056,653
CAR BRAKE MECHANISM
Filed March 22, 1934    5 Sheets—Sheet 5

Inventor
Glenn E. Edmunds

Patented Oct. 6, 1936

2,056,653

UNITED STATES PATENT OFFICE 2,056,653

CAR BRAKE MECHANISM

Glenn E. Edmunds, Columbus, Ohio, assignor to The Bonney-Floyd Company, Columbus, Ohio, a corporation of Ohio Application March 22, 1934, Serial No. 716,895

17 Claims. (Cl. 188—55)

The present invention relates to a brake system for track mounted vehicles and includes a novel arrangement of brakes and actuating mechanism therefor. The brake arrangement, although not confined to use with any particular type of wheel mounting, is particularly effective in the case of independently sprung wheels, the arrangement being such that the brakes due to their mounting automatically accommodate themselves to the wheel positions. Preferably brake actuating mechanism is provided whereby the brakes may be actuated from either side of the car at one end of the latter, this being covered in a divisional application now Patent No. 2,050,937, issued August 11, 1936.

For the purpose of illustration, the invention has been shown in the accompanying drawings as applied to a mine car and in the drawings, Figure 1 is a side elevation of the car.

Figure 2 is a section substantially on line 2—2 of Figure 3, showing the brake mounting.

Figure 3 is a section substantially on line 3—3 of Figure 2.

Figure 4 is a section substantially on line 4—4 of Figure 3.

Figure 5 is a section substantially on line 5—5 of Figure 3.

Figure 6 is a section substantially on line 6—6 of Figure 3.

Figure 7 is an end elevation of the car of Figure 1 showing one suitable form of brake actuating mechanism manipulatable from either side of the car.

Figure 8 is a view similar to Figure 7 showing a modified form of brake actuating mechanism.

Figure 9:
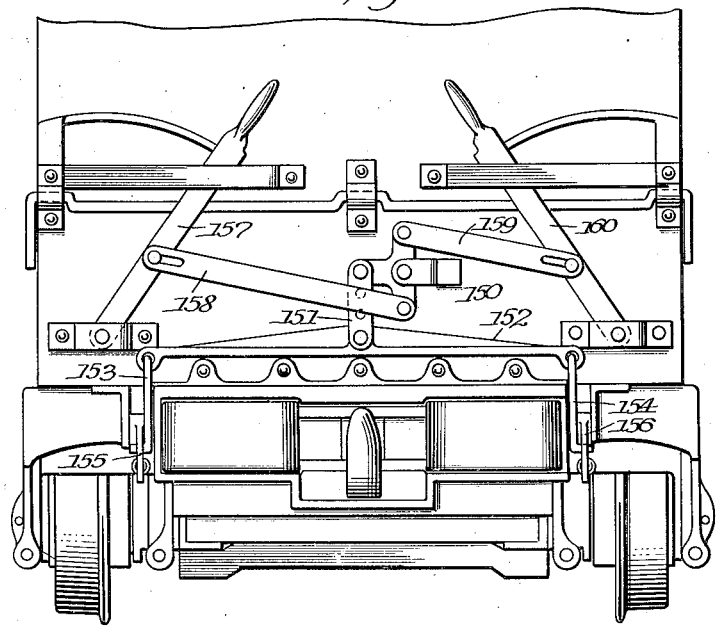
Figure 9 is a view similar to Figure 7 showing a further modified form of brake actuating mechanism.

Referring to the drawings, reference numeral 10 designates generally a car body having end walls 11 and 12, side walls and a centrally depressed lading bottom. One of the side walls is indicated at 13, in Figures 1 and 4 to 6. In Figures 4 to 6, a depressed central floor plate is indicated at 14 as supported on the longitudinal flange 15 of a sill member 16 which extends from end to end of the car. A riser plate 17 is secured to the vertical flange of the sill member and extends from end to end of the car as here shown, a flare plate 18 extending between the upper edge of riser 17 and the lower edge of side wall 13 and being secured to the latter through an auxiliary longitudinal sill member in the form of an angle bar 19. It will be understood that this construction is duplicated at the other side of the car. The end wall 11 as here shown is provided with a lower gate portion 20, Figure 1, while end wall 12 is fixed and has mounted thereon certain brake actuating mechanism to be hereinafter described.

Secured beneath flare plate 18 and against riser 17 is a box-like housing 21, which has aligned pairs of downwardly open pedestal portions, one pair being particularly shown in Figure 6 at 22 and 23 and the outer pedestal portion of the other pair being shown at 24, Figure 1. The outer pedestal portions 22 and 24 have upwardly extending recesses 25 and 26, whereas the inner pedestal portions, as at 23, have upwardly extending grooves as at 27, Figure 6. Vertical ribs 28 and 29 are formed on the inner side of pedestal 22 and extend marginally of recess 25 to the top wall 21' of the housing, their lower extremities 28' and 29', Figure 1, being provided with aligned apertures for the reception of a bolt 30. Similar ribs 31 and 32 are formed on the inner side of pedestal portion 23 and extend marginally of groove 27. The lower extremities 31' and 32', Figures 4 and 6, of ribs 31 and 32 are provided with aligned apertures for the reception of a bolt 33. The other pedestal portions of housing 21 are provided with similar ribs and in Figure 1 a bolt, corresponding to bolt 30, is shown at 34.

Received in housing 21 between pedestal portions 22 and 23 is a yoke or bearing member 35 which has side walls slidable relative to the inner surfaces of the pedestal portions and provided with grooves receiving ribs 28, 29, 31 and 32 which serve to guide the yoke in its vertical movements relative to the housing. The yoke 35 has leg or pedestal portions 36 and 37 provided respectively with hub portions 38 and 39 projecting in recess 25 and groove 27 and slidably guided thereby. The leg portions 36 and 37 are connected by an integral top wall 40 which, at its four corners, is recessed to provide spring seats 41, 42, 43 and 44 having centering bosses therein and receiving the lower ends of compression springs 45, 46, 47 and 48 whose upper ends bear against the undersurface of the top wall 21' of housing 21 and are centered by means of bosses as particularly shown in Figure 3. Relative movements of housing 21 and yoke 35 are limited on the one hand through abutment of hubs 38 and 39 with the upper edges of recess 25 and groove 27 or of wall 40 with wall 21', or both, and on the other hand through bolts 30 and 33 which extend beneath hub portions 38 and 39.

Hub portions 38 and 39 are apertured to receive collars 49 and 50 which receive the ends of a stub axle 51 here shown as being hexagonal, the receiving openings in the collars being correspondingly shaped. Between the collars a sleeve 52 is mounted on axle 51, the sleeve passage having a shape corresponding with that of the axle. At its inner end sleeve 52 has formed thereon an integral angular flange 53, while on its outer end is threaded a ring 54. Roller bearing assemblies 55 and 56 are engaged between flange 53 and ring 54 and an inwardly projecting flange 57 formed in the hub of a flanged wheel 58. For the sake of vertical compactness, clearance for the upper edge of the wheel flange is provided by a slot 40' in the top wall 40 of the yoke. Lugs 59 and 60 projecting outwardly from hub 38 are provided with aligned apertures which receive a pin 61 which holds the stub axle and collar 49 against outward movement, inward displacement of the axle and collar 50 being prevented by the adjacent face of pedestal portion 23.

A yoke 62 similar to yoke 35 is mounted in the other pedestal portions of housing 21 in exactly the same manner as above described and carries a wheel 58' in tandem relation with wheel 58. A housing 63 similar to housing 21 and similarly equipped with yokes and wheels is mounted at the opposite side of the car.

Housing 21, Figures 1 and 4, has an upstanding ear 64 spaced somewhat from the side wall 13 and has pivoted thereto a pair of hooks 65 and 66 whose outer ends project beyond the car ends. The outer end of hook 65 is guided for movement by a strap 67, while the outer end of hook 66 is held against substantial movement by means of a strap 68. Similar hooks similarly mounted are provided at the other side of the car. These hooks serve as auxiliary draft connections, draft being transmitted thereby directly to the wheel housings.

Since the brakes and their mounting means are the same at both sides of the car, it will be necessary to describe only those appearing at the side of the car shown in Figure 1 and appearing also in Figures 2 to 6.

Yoke 35 is provided with a pair of ears 69 and 70 projecting toward yoke 62, the ear 69 being relatively close to the outer side of the housing 21 and the ear 70 being slightly beyond the longitudinal central plane of the housing, that is, one is at each side of the tread of wheel 58. These ears are provided with aligned apertures and are themselves in alignment with similar ears 71 and 72 on yoke 62. A U-shaped yoke or hanger 73 is suspended from ears 69 and 70 by means of bolts 74 and 75 which are tensioned and preferably locked to permit pivoting of the hanger relative to the wheel mounting or bearing member 35. An identical yoke or hanger 76 is similarly suspended from ears 71 and 72.

Supported in yokes 73 and 76 is a brake housing 77 made up of a pair of channel members 78 and 79 arranged face to face with their adjacent edges in vertical planes, that is, with their flanges in horizontal planes. The housing 77 rests on the cross portions of the yokes and is connected thereto by means of bolts 80 and 81, the receiving apertures for the bolts being somewhat larger than the shanks of the latter, so that the housing may take slightly different angular positions relative to the yokes without binding. Slidably arranged in the open end portions of the housing is a pair of brake blocks or shoes 82 and 83 which are so positioned by the housing as to be able to engage the treads of the wheels 58 and 58', the outer ends of the brake blocks being suitably arcuate for engagement with the wheel treads. The brake blocks are provided with slots 84 and 85 which clear bolts 80 and 81, so that there can be no binding with the latter, the slots being so arranged as to permit adequate movement of the blocks toward and away from the wheels. A plate 86 secured to the inner end of block 82 carries a rack 87 having upwardly faced teeth in a plane below the central horizontal plane of housing 77, the extremity of the rack having thereon a toe 88 for guiding contact with the bottom wall of the housing. A similar rack 89 is secured to the inner end of block 83, the teeth, however, being downwardly faced and lying in a plane the same distance above the central horizontal plane of the housing as rack 87 is below. The two racks are engaged by a pinion 90 here shown as integral with a hollow shaft 91 which has end portions journaled in bearings formed in the housing side walls and shouldered within the housing to prevent axial displacement of the pinion relative thereto. For the purpose of increasing the bearing surface for the sleeve apertured plates 92 and 93 are fixed to the housing side walls as by welding. The inwardly projecting portion of shaft 91 is of hexagonal cross-section and tapered and is received in a mating aperture in the hub 94 of a crank arm 95. The crank arm is held on shaft 91 by means of a bolt 96 passing through the latter, the nut being threaded on the inner end of the bolt so that the latter may be inserted and removed without interference with the inner wall of housing 23, the same also applying to bolts 80 and 81.

From the above, it will be seen that upon movement of crank arm 95 with consequent rocking of shaft 91 and pinion 90, the racks and therewith the brake blocks are projectable and retractible and in view of the semi-floating mounting of housing 77, the action of blocks 82 and 83 is automatically equalized. Furthermore, vertical movement of one wheel relative to the other correspondingly moves the housing in view of the fact that the housing is suspended at its ends from the wheel bearing members or yokes 35 and 62.

The housing 77 provides positive guide means for the blocks, upward re-action of the latter being taken by the housing top wall and transmitting through bolt 80 or 81 and yoke 73 or 76 to the associated bearing member 35 or 62. Downward re-action is transmitted through the cross portions of yokes 73 and 76 to the associated wheel bearing members. As here shown, the brake blocks are considered to be of wood, but they may be of any other suitable material. For example, they might be made of cast iron and in such case the racks might be formed integral therewith. In any case, the racks should have some such provision as the toe portion 88 to prevent their spreading.

Disposed at opposite sides on end wall 12 of the car is a pair of hand levers 97 and 98, these hand levers being pivoted on bolts 99 and 100 for swinging movements in a plane parallel to the plane of the end wall. The upper ends of the hand levers are guided under straps 101 and 102 and are provided toward the wall with knife edges adapted to engage toothed segments 103 and 104, whereby the levers may be held in adjusted position. Common releasing means for the hand levers is provided by cam portions 105 and 106 formed on a rod 107 journaled between the levers and the car end wall, the ends of the rod being provided with arms 108 and 109, either one of which may be grasped to rock the rod and cam the upper ends of the levers out of engagement with their segments to permit them to return to inoperative position.

Pivoted to the car end beneath hand lever 97 on a bolt 110 is a three-armed bell crank lever having a substantially horizontally extending arm 111 and upwardly and downwardly extending arms 112 and 113. Arm 112 is connected to the lower end of hand lever 97 by means of a link 114. Arm 111 has connected thereto one end of a link 115 whose other end engages a substantially horizontally extending arm 116' of a bell crank lever 116 whose other downwardly extending arm 117 has connected thereto one end of a link 118, this bell crank lever being pivotal on a bolt 119 having an axis extending transversely of the car, the bolt 119 being mounted in a bracket 120 fixed beneath the end of flare plate 18. The other end of link 118 is engaged in an aperture in the upper end of crank arm 95, the arrangement of parts being such that link 118 extends substantially horizontally and at the inner side of wheel 58' and freely within yoke 62. Preferably the link has interposed therein a turn-buckle 121, so that its length may be altered.

A three-armed lever pivoted on a bolt 122 beneath hand lever 98 has a substantially horizontally extending arm 123 and upwardly and downwardly extending arms 124 and 125. Arm 124 is connected with the lower end of hand lever 98 by means of a link 126, while arm 123 is connected by means of a link 127 with one arm of a bell crank lever 128 and from the latter, by means of a link similar to link 118, with the end of the crank arm 95 at its side of the car. Arm 113 is connected by means of a link 129 with arm 124 and arm 112 is connected by means of a link 130 with arm 125. Thus as regards the three-armed levers, it will be noted that their horizontally extending arms project in opposite directions and that the upper arm of one is connected to the lower arm of the other, while the lower arm of the first is connected with the upper arm of the second.

If the brakes are to be applied, the upper end of lever 97, for example, is swung toward its side of the car, so that the associated three-armed lever 111 is swung in a clockwise direction, thus moving the brake blocks 82 and 83 toward and against their adjacent wheels. At the same time, the other three-armed lever has been swung in a counter-clockwise direction through link 129, the consequent upward movement of arm 123 applying the brakes at that side of the car. To release the brakes, the knock-off cam is operated so that both the hand levers are freed from their segments and may be returned. All of the described linkage is rigid and thus effective under compression, as well as under tension, so that the brakes may be positively released. It should also be mentioned that links 129 and 130 are of equal length and are pivoted to the associated arms of the three-armed levers at equal distances from the axes of the latter. In view of the provision of the two links, 129 and 130, one acts under tension no matter which of the hand levers is moved to apply the brakes. It is preferable that the brake actuating linkage, particularly where the parts are of any considerable length, act under tension for brake actuation, as will be appreciated.

Figure 10:
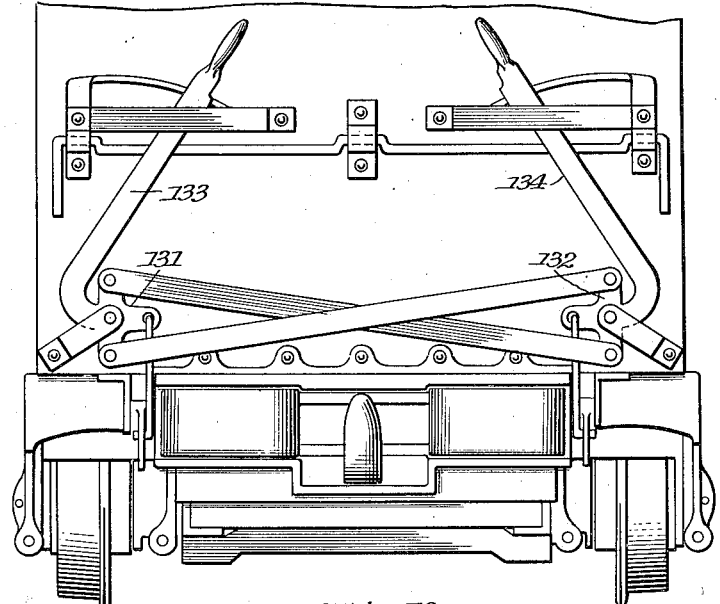
Figure 10 is a view similar to Figure 7 showing a still further modified form of brake actuating mechanism.

The arrangement shown in Figure 10 is similar to that shown in Figure 7, with the exception that the three-armed levers 131 and 132 have their horizontally extending arms projecting inwardly and the hand levers 133 and 134 are formed integral with the three-armed levers respectively. The arrangement functions exactly as that above described.

In the arrangement shown in Figure 8, the three-armed levers 135 and 136 are arranged substantially as in Figure 7. In this instance, however, the hand levers 137 and 138 have pin and slot connections with the three-armed levers, the pins and slots being designated at 139, 140 and 141, 142 respectively. The slot 140 is formed in a link 143 provided at its other end with a plurality of apertures, through any one of which the link may be engaged pivotally with the hand lever 137. The slot 142 is formed in a similar link 144. With this arrangement, hand lever 137, for example, may be swung outwardly to apply the brakes without affecting the position of hand lever 138, pin 141 merely moving to the right in slot 142. Similarly, the brakes may be applied through hand lever 138 without affecting the position of hand lever 137. However, a knock-off cam 145 may be provided, if desired, for use particularly when the pin and slot connection provides insufficient lost motion, due to uncorrected stretching of the linkage or wear of the brakes, so that when one hand lever is actuated the other may be moved to some extent along its cooperating segment. Due to the provision of the slots positive release of the brakes is not possible, so that spring release means are provided. For example, bell crank levers 146 and 147, which correspond to bell crank levers 116 and 128 in Figure 7, may have their lower arms engaged by tension springs 148 and 149 whose other ends are suitably anchored to fixed parts of the car. Springs 148 and 149 act to release the brakes and hold them released.

In Figure 9, a single three-armed lever 150 is provided. The horizontally extending arm of this lever has a link 151 suspended therefrom and pivotally supporting at its lower end an equalizing bar 152. Link 151 lies substantially in the central vertical longitudinal plane of the car and engages the central portion of the equalizing bar. To the ends of bar 152 are connected links 153 and 154 whose other, lower ends engage bell crank levers 155 and 156 exactly the same as bell crank levers 146 and 147, Figure 8, and similarly spring-influenced. A hand lever 157 has a pin and slot connection with one end of a link 158 whose other end is pivoted to the lower arm of lever 150, the upper arm of the latter being connected by means of a link 159 with a hand lever 160 and having a pin and slot connection with the same. Here, as in the construction shown in Figure 8, either hand lever may be manipulated without affecting the position of the other, the equalizing bar functioning in the well known manner.

It will be evident that while I have mentioned a pair of hand levers as being a desirable provision in the various arrangements just described, one lever might be omitted in each instance without affecting the operability of the system.

The invention is susceptible of varied embodiment and accordingly I do not limit myself as regards the specific form and arrangement of elements above described, the scope of the invention being defined in the following claims.

I claim:

1. The combination with a car having a pair of independently sprung wheels in tandem relation, of a housing disposed between said wheels and having an open end adjacent each wheel, means supporting the housing ends in connection with the respective wheels in such manner that the housing is an unsprung element displaceable with the wheels relative to the sprung portion of the car, brake blocks slidable in the ends of said housing, and means operable to move said blocks toward and against said wheels.

2. The combination with a car having a pair of independently sprung wheels in tandem relation, of a supporting member mounted between said wheels with capability of bodily movement toward and away from the wheels, brake blocks slidably supported by said supporting member adjacent the respective wheels, and means for moving said blocks relative to said supporting member toward and against said wheels, said means comprising a member journaled in said supporting member and extending between said blocks, the action of said blocks being equalizable automatically through appropriate movement of said supporting member.

3. The combination with a car having a pair of wheels in tandem relation and independent bearing members for said wheels respectively, the car comprising a frame spring-supported on said members, of a housing disposed between said wheels and having an open end adjacent each wheel, said housing being pivotally supported at its ends by said bearing members, brake blocks slidably supported in the ends of said housing, and means operable to move said blocks toward and against said wheels.

4. The combination with a car having a pair of wheels in tandem relation and independent bearing members for said wheels respectively, the car comprising a frame spring-supported on said members, of a housing disposed between said wheels and having an open end adjacent each wheel, said housing being pivotally supported at its ends by said bearing members, brake blocks slidably supported in the ends of said housing, and means including a member journaled in said housing operable to move said blocks toward and against said wheels.

5. The combination with a car having a pair of wheels in tandem relation and independent bearing members for said wheels respectively, the car comprising a frame spring-supported on said members, of a supporting member disposed between said wheels and pivotally supported at its ends by said bearing members, brake blocks supported by said supporting member adjacent the respective wheels, and means operable to move said blocks toward and against said wheels.

6. The combination with a car having a pair of wheels in tandem relation and independent bearing members for said wheels respectively, the car comprising a frame spring-supported on said members, of a supporting member disposed between said wheels and pivotally supported at its ends by said bearing members, brake blocks supported by said supporting member adjacent the respective wheels, and means operable to move said blocks toward and against said wheels, said last-named means comprising a rock shaft carried by said supporting means and extending between said blocks.

7. The combination with a car having a pair of wheels in tandem relation and independent bearing members for said wheels respectively, the car comprising a frame spring-supported on said members, of a housing disposed between said wheels and having an open end adjacent each wheel, yokes pivotally connected to said bearing members in depending relation and supporting the ends of said housing, brake blocks slidable in the ends of said housing, and means operable to move said blocks toward and against said wheels.

8. The combination with a car having a pair of wheels in tandem relation and independent bearing members for said wheels respectively, the car comprising a frame spring-supported on said members, of a housing disposed between said wheels and having an open end adjacent each wheel, yokes pivotally connected to said bearing members in depending relation and supporting the ends of said housing, brake blocks slidable in the ends of said housing, and means operable to move said blocks toward and against said wheels, said housing having side walls and said last-named means comprising a rock shaft journaled in said side walls.

9. Apparatus according to claim 7 wherein said housing is constituted by two channel members in face to face relation.

10. Apparatus according to claim 7 wherein said housing is constituted by two channel members in face to face relation with their adjacent edges in vertical planes.

11. A brake housing comprising a pair of channel members in face to face relation, and means for retaining said members in such relation.

12. Brake mechanism comprising an open ended housing having top, bottom and side walls, a pair of brake locks positioned in the end portions of said housing and guided by said walls for sliding movements, a rack secured to one of said blocks and slidably guided against one of said walls, a rack secured to the other of said blocks and slidably guided against the wall opposite said one of said walls, said racks having inwardly faced toothed portions, a pinion engaging said toothed portions, and a rock shaft journaled in said housing and on which said pinion is fixed.

13. Brake mechanism comprising a housing including a bottom wall and side walls, a pair of brake blocks positioned in the end portions of said housing and guided by said walls for sliding movements, said blocks having slots therein parallel to said bottom wall, bolts extending through apertures in said side walls and through said slots respectively, hangers engaged by said bolts, and means operative to force the blocks apart.

14. Brake mechanism including a housing comprising a pair of channel members in face to face relation with their flanges in horizontal planes, and suspension means comprising yokes embracing and supporting the respective ends of the housing.

15. Brake mechanism including a housing comprising a pair of channel members in face to face relation with their flanges in horizontal planes, suspension means comprising yokes embracing and supporting the respective ends of the housing, and bolts passed through the respective yokes and the channel members.

16. Brake mechanism including a housing comprising a pair of channel members in face to face relation with their flanges in horizontal planes, suspension means comprising yokes embracing and supporting the respective ends of the housing, bolts passed through the respective yokes and the channel members, and brake blocks slidable in the end portions of said housing and having slots parallel to said flanges passing said bolts.

17. Brake mechanism comprising a housing having top, bottom and side walls, and open ends, brake shoes constituted by wooden blocks slidable in the end portions of said housing, the adjacent ends of said blocks having metal plates secured thereto, racks projecting respectively from the plates in parallel relation, the racks having opposed teeth and having outer edge portions guided respectively by the top and bottom housing walls, and an actuating pinion engaging the teeth of said racks.

GLENN E. EDMUNDS.